United States Patent
Wu et al.

Patent Number: 6,024,488
Date of Patent: Feb. 15, 2000

[54] HIGHLY ACCURATE TEMPERATURE SENSOR USING TWO FIBER BRAGG GRATINGS

[75] Inventors: Jing-shown Wu, Taipei; Shyh-Lin Tsao, Shin-Diann, both of Taiwan

[73] Assignee: National Science Council, Taipei, Taiwan

[21] Appl. No.: 08/955,296

[22] Filed: Oct. 21, 1997

[30] Foreign Application Priority Data

Jun. 30, 1997 [TW] Taiwan .......................... 85109843 A01

[51] Int. Cl.$^7$ ............... G01K 11/00; G02B 6/00
[52] U.S. Cl. ............................ 374/161; 385/12
[58] Field of Search ................. 374/161; 385/12

[56] References Cited

U.S. PATENT DOCUMENTS

| | | | |
|---|---|---|---|
| 4,649,529 | 3/1987 | Avicola | 385/12 |
| 5,144,690 | 9/1992 | Domash | 385/12 |
| 5,351,324 | 9/1994 | Forman | 385/12 |
| 5,563,967 | 10/1996 | Haake | 385/12 |
| 5,869,835 | 2/1999 | Udd | 385/12 |

*Primary Examiner*—Randy W. Gibson
*Attorney, Agent, or Firm*—Jacobson, Price, Holman & Stern PLLC

[57] ABSTRACT

A new highly accurate temperature sensor for biomedical applications is proposed in this invention. This sensor including two fiber Bragg gratings with different thermal coefficients can accurately measure temperature with little laser frequency stabilization. This invention improves the measurement resolution and accuracy. Such a sensor can be used to calibrate the other fiber biomedical sensors when those fiber sensors are packaged together.

20 Claims, 4 Drawing Sheets

HIGHLY ACCURATE TEMPERATURE SENSOR USING TWO FIBER BRAGG GRATINGS

BACKGROUND OF THE INVENTION

1. Field of the Invention

The present invention, temperature sensor using two fiber Bragg gratings, improves the accuracy of a well known traditional fiber grating temperature sensor. It can also be used with other fiber biomedical sensors or environmental sensors for calibration.

2. Description of the Related Art

Fiber optic temperature sensors have been extensively studied since 1980. Different types of fiber optics sensors can be used to measure temperature in many areas due to the following advantages of fiber optics: compactness and smallness, resistance to chemical corrosion, immunity to electromagnetic interference and biocompactibility, etc. So they are excellent candidates as bio-temperature sensors. Currently it is common to combine fiber optics and chemical sensor to make a biomedical signal sensor in the development of medical sensors. The spectral changes at the chemical sensor head is detected and analysis outside the body through the transmission of fiber optics. Basically these types of sensors all required temperature calibrations in order to work properly. The accuracy of temperature measurement is of vital importance.

The present invention use two fiber optic gratings to achieve accurate temperature measurement and calibration. Its performance is not affected by frequency drifting. Furthermore, no thermocouple is needed in the biomedical sensor package. The biomedical sensors will be all optical and miniaturized because the temperature sensor is made of fiber optics.

CROSS-REFERENCE TO RELATED APPLICATIONS

In 1993 S. Bracci, et al., proposed a method for pH value measurement by a fiber optics sensor in Sensors and Actuators, A: Physical, Vol. 37., No. 2, pp. 180~186. In 1992 R. Wolthius, et al., published a technology for in vivo $O_2$ measurement in *IEEE Trans.* Biomed. Eng., Vol. 39, No. 2, pp.185~193. M. D. Fox et al., proposed a method for the examination of blood glucose level by polarization state of light in 1990 Proceedings of Northeast Conference: Bioengineering, pp. 101~102.

Recently, A. G. Mignani et al., reported an in vivo fiber optic monitoring sensors in *IEEE J.* Lightwave Technol., Vol. 13, No. 7, pp. 1396~1406. By using fiber optic sensors, the pH value, oxygen concentration and CO2 value can be monitored simultaneously. This report indicated that it is very attractive to use fiber optic sensor for biomedical signal measurement. The future trend will be the integration of fully optical biomedical fiber optic sensor.

But the fiber optic sensor proposed by A. G. Mignani et al., used thermocouple to measure the body temperature and to calibrate other fiber optic sensors. It is known that when electrical medical sensors get in touch with blood they may contaminate the blood and cause other adverse side effects, or may even be fatal. We believe the in vivo temperature sensor made of thermocouple will be replaced by fiber optic sensor. Therefore the use of fiber sensor in biomedical applications will be more suitable and more flexible.

R. Wolthius et al., disclosed a biomedical fiber optic temperature sensor in *IEEE Trans.* Biomed. Eng., Vol. 38, No. 10, pp.974~981. It was difficult to fabricate because it had an external temperature sensor that is outside of the fiber optic. The temperature sensor external to the fiber optic is a chemical material that gives out fluorescent light. Lifetime of the fluorescent light relates to temperature. The signal processing circuit for this kind of temperature measurement is complicated and no real time measurement is possible.

In the field of optoelectronics, many sensors that use fiber gratings are continuously developed. For example, some measure pressure and temperature methods were published in IEEE photon. Technol. Lett., Vol. 5, No. 9, pp. 1112~1114, 1993(A. T. Alavie et al.) and, published in Electron. Lett., Vol.29, No. 4, pp. 398~399, 1993(M. G. Xn et al.). They can even do real time measurement by multiplexing processing. Frequency response of this type of Bragg fiber grating changes with temperature. The typical technique is to use the wavelength at the reflection spectrum maximum for temperature measurement. So the accuracy of those methods are limited. Therefore, the above methods had some disadvantages in practical biomedical applications.

The present invention can improve problems of the typical techniques and can be easily combined with other fiber sensors for biomedical applications.

SUMMARY OF THE INVENTION

The main purpose of the present invention is to provide an innovative highly accurate temperature sensor that can improve the accuracy of a typical sensor using fiber optic gratings. This highly accurate temperature sensor using two fiber Bragg gratings has two gratings of different materials. Temperature can be accurately measured by the reflected laser light. This temperature sensor using two fiber optic gratings does not require optical frequency or wavelength spectrum analyzers. The present invention increase the resolution and accuracy of temperature sensing and without error incurred by drifting of optical frequency or wavelength.

Because it is suitable for medical application for in vivo temperature measurement and calibration, the other purpose of the present invention is to improve the design of in vivo temperature sensor and to provide a temperature sensor device that is compatible with other fiber optic sensors. The volume of the sensor is effectively reduced so that it can be easily inserted into blood vessel for biomedical signal detection of micro-structure, easily.

The present invention has very high resolution achieved to 0.01° C. Therefore it can be used in biomedical applications or high accuracy environmental temperature measurement.

Figure 1:
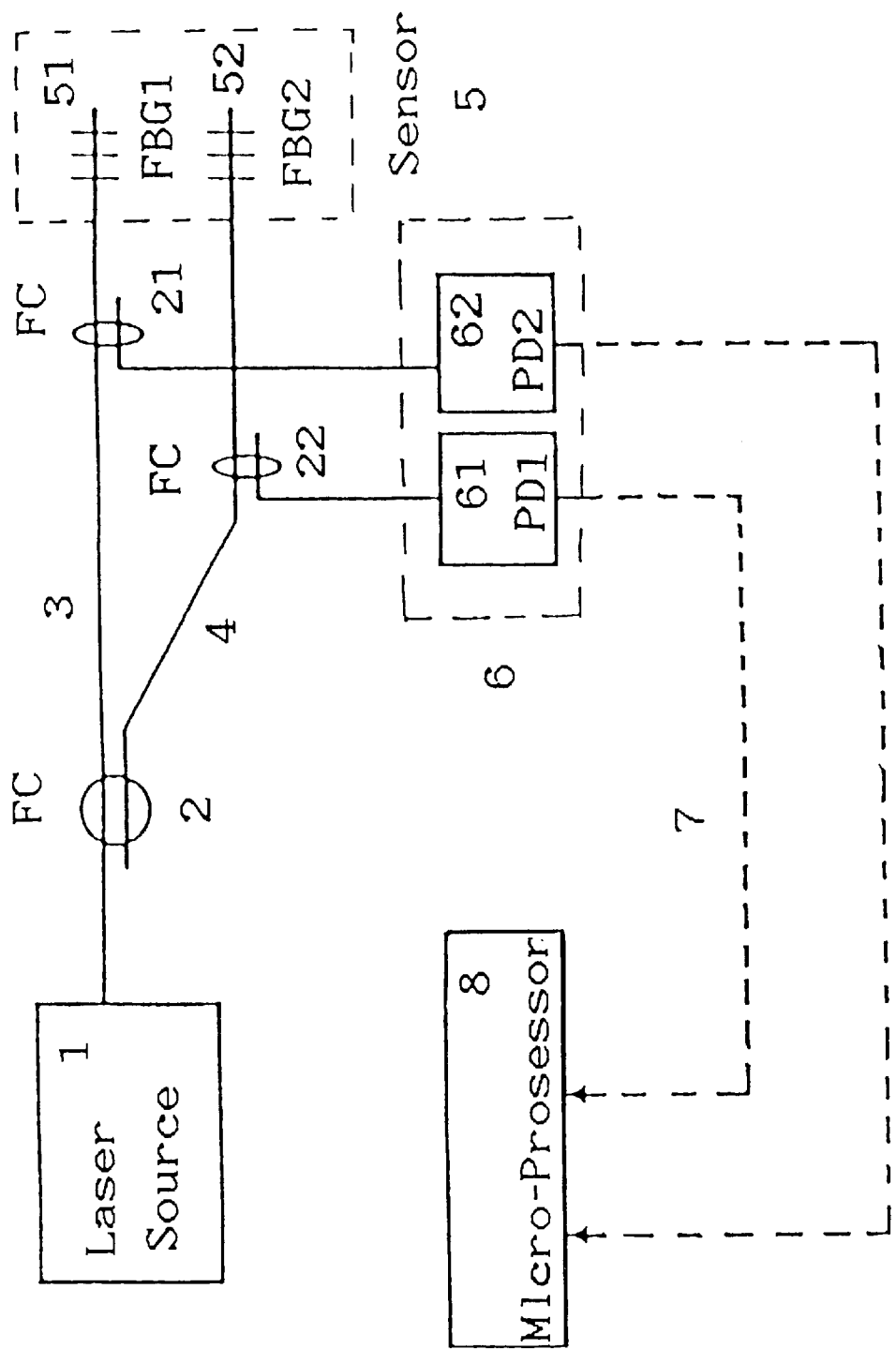
FIG. 1 is a system structure of a temperature sensor using two fiber Bragg gratings 1 . . . laser source 2, 21, 22 . . . Fiber coupler(FC)

3 . . . Fiber branch 1

4 . . . Fiber branch 2

5 . . . temperature sensor

51 . . . Fiber Bragg gratings 1(FBG1)

52 . . . Fiber Bragg grating 2(FBG2)

61 . . . Photodetector 1(PD1)

6 . . . Optical-electric convertor

62 . . . Photodetector 2(PD2)

8 . . . microprocessor

7 . . . cable for delivery of photodetector signals.

Figure 2A:
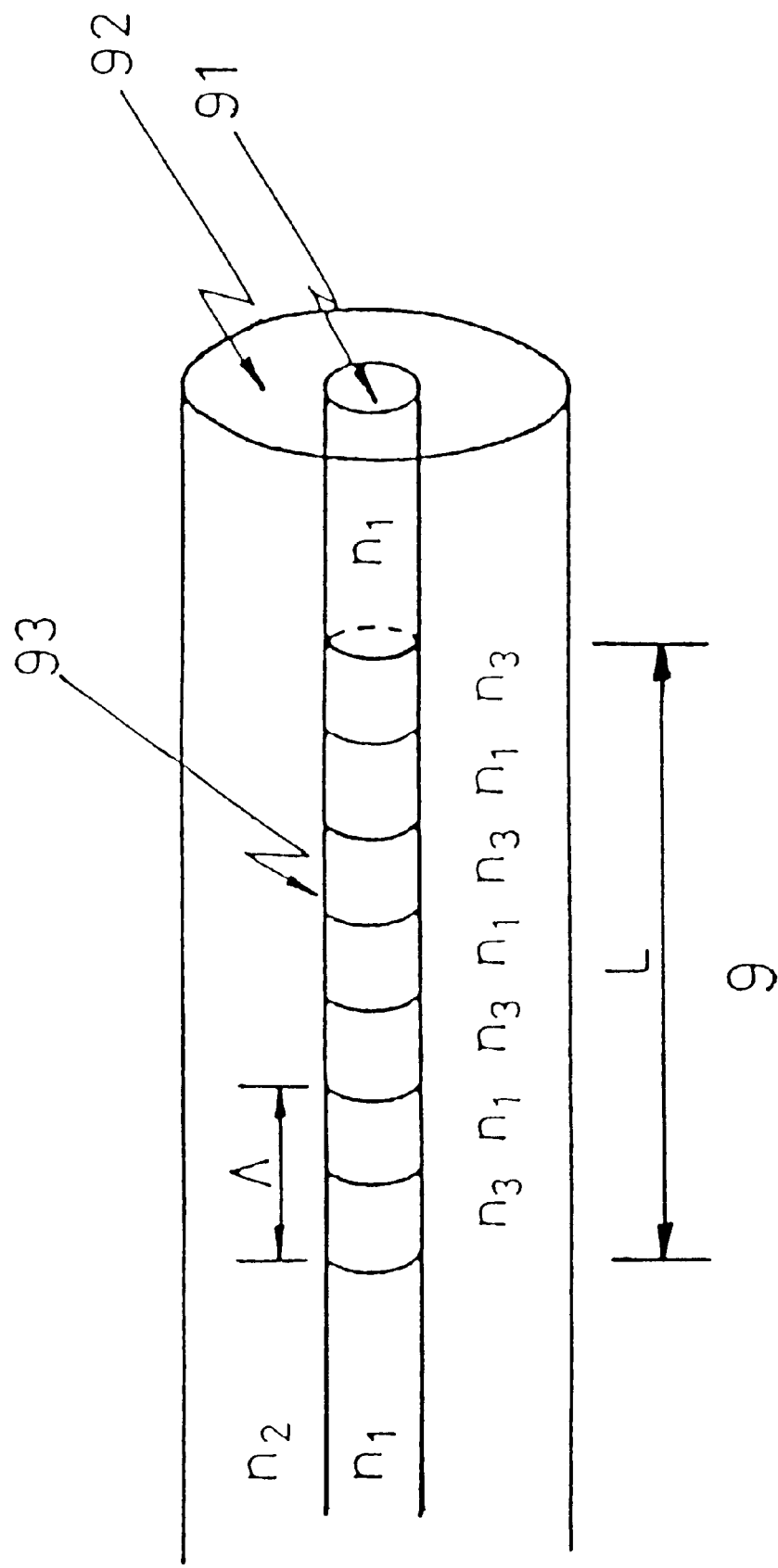
Figure 2B:
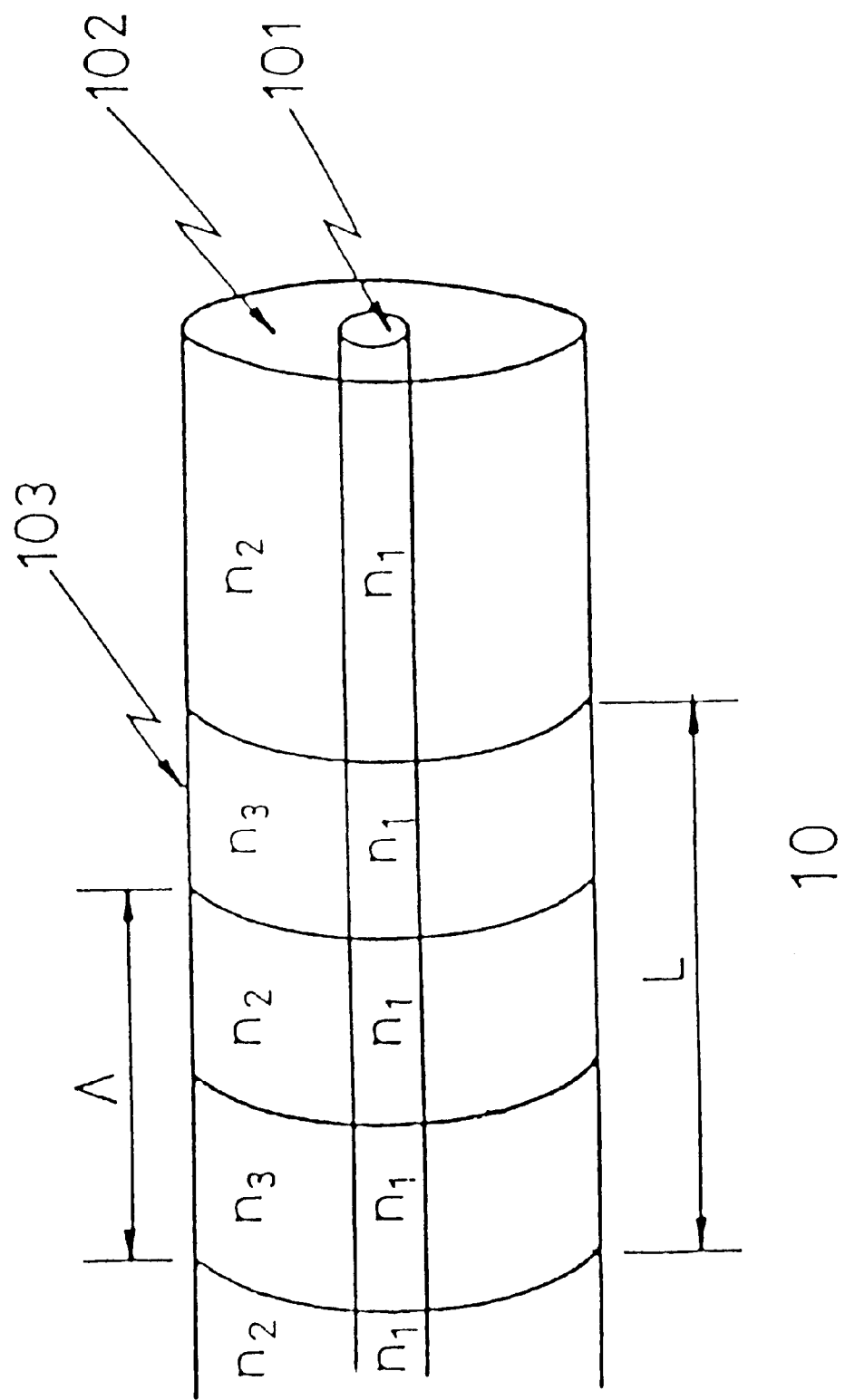
Figure 2C:
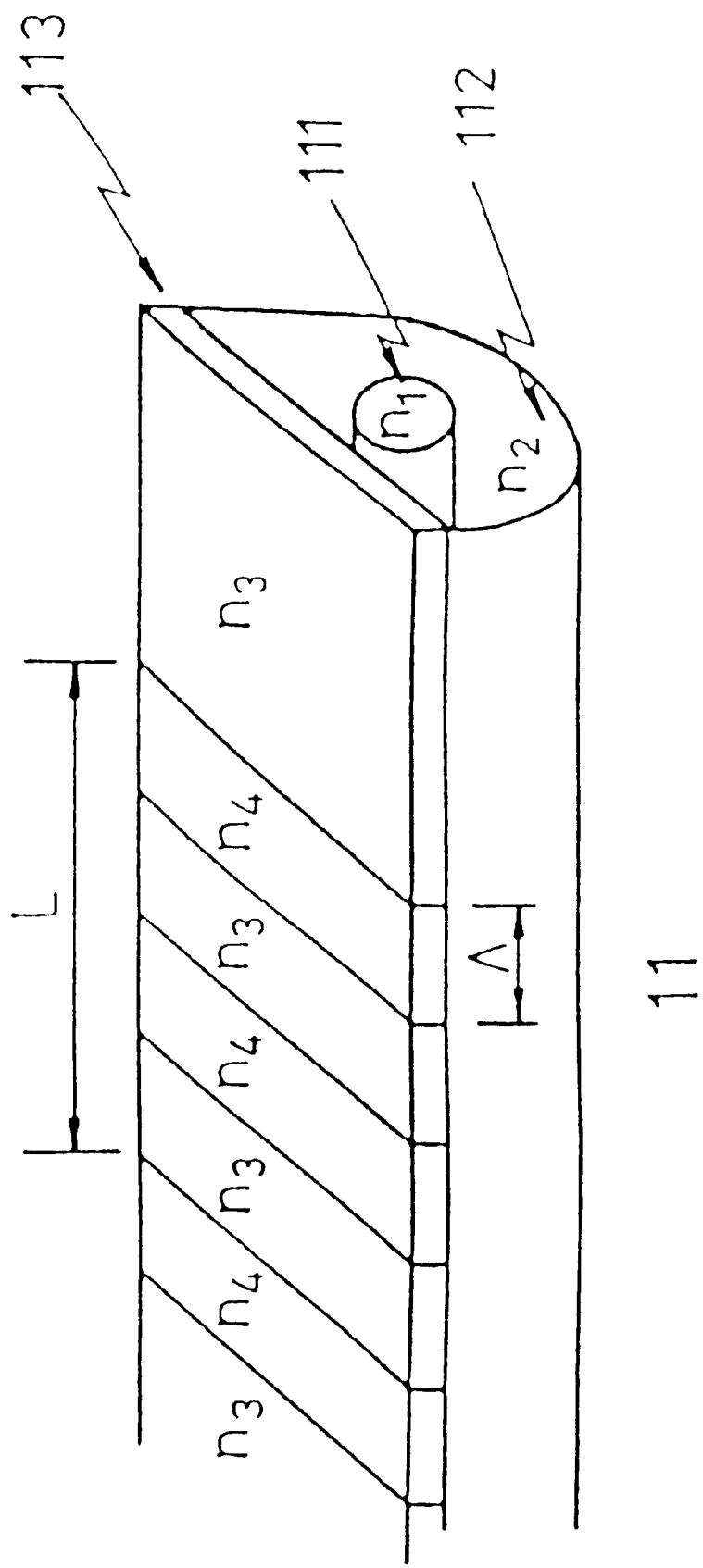

FIGS. 2(a)–2(c). Structure of a fiber grating.

(a) The fiber core is a fiber grating using light sensitive material.
(b) The fiber cladding is a fiber grating using light sensitive material.
(c) D-type fiber grating 9 . . . grating fabricated in fiber core.
91 . . . fiber core
92 . . . fiber cladding
93 . . . fiber grating
10 . . . grating fabricated on fiber cladding.
101 . . . fiber core
102 . . . fiber cladding
103 . . . fiber grating
11 . . . grating fabricated on polished fiber cladding.
111 . . . fiber core
112 . . . fiber cladding
113 . . . waveguide grating.

DETAILED DESCRIPTION OF THE INVENTION

As shown in FIG. 1, the present invention "highly accurate temperature sensor using two fiber Bragg gratings" includes a temperature sensor(5) that consists of a laser source(1), fiber couplers(2, 21, 22), fiber Bragg gratings(51, 52); two photodetector(61, 62) and a microprocessor(8). The present invention uses a narrow spectrum laser(1) as the light source. The light coming from the light source is divided into two paths by fiber coupler(2). The light in fiber optic branch 1(3) passes through another fiber coupler(21) to fiber Bragg gratings 1(51). The light in fiber optic branch 2(4) passes through another fiber coupler(22) to fiber Bragg gratings 2(52). The fiber Bragg grating 1 and fiber Bragg grating 2 are grouped together as a temperature sensor(5). The reflected light from fiber Bragg grating 1 and fiber Bragg grating 2 is guided to Optical-electric convertor (6). By photodetector 1(61) and photodetector 2(62) the reflected light are converted to electrical signals, respectively. The electrical signals are then delivered to microprocessor(8) through cable(7) for processing so that accurate temperature reading is obtained. One of ordinary skill in the art will understand that the laser source may include a conventional isolator to prevent reflected light from interfering with its operation.

The present invention uses a narrow spectrum laser as the light source. The spectrum width of the laser has to be narrower than the spectrum width of the transmission spectrum and reflection spectrum of the fiber Bragg grating. One of ordinary skill in the art will understand that the line width of the laser should be much narrower than the reflected spectrum of the fiber Bragg grating to enhance the resolution of the sensor. The optical coupler serves the function as a beam divider. Any type of optics component, such as prism or waveguide coupler, etc., that can be used as a beam divider can be the substitute. The optical frequency response of the optical coupler in the operation range is of no concern. It can be calibrated in advance and the data in microcomputer will be adjusted accordingly. Of course, one of ordinary skill in the art will understand that using an optical fiber with a length longer than the coherence length of the laser would prevent the light reflected from the Bragg sensor from interfering with light from the laser source traveling in the optical fiber. Naturally, light which is not reflected by the Bragg sensor will simply pass out of the end of the fiber.

There are many methods of forming fiber Bragg gratings. FIGS. 2(a)–2(c) show the forming of fiber gratings on fiber core, fiber cladding or fiber core and fiber cladding. The general type(9) has the fiber Bragg grating fabricated on the fiber core. The fiber core(91) is composed of photosensitive materials. By ultraviolet interference or phase shift mask exposure the grating is formed through the periodic changes of the refractive index. As shown in FIG. 2(a), refractive index of the fiber core is n1 before exposure. The refractive index becomes n3 at the exposed regions. The fiber Bragg grating(93) is formed from such a way. The refractive index n2 of the fiber cladding must be smaller than n1 and n3. One of ordinary skill in the art should realize from FIG. 2(a) that the refractive index n2 should be smaller than n1 and n3 for good confinement of light in the core of the fiber. In FIG. 2(b), the photosensitive material doped in the fiber cladding (102). The refractive index of the fiber core (101) is not changed while that of the fiber cladding undergoes periodic changes after exposure to form the grating(103). This method fabricates fiber Bragg grating(10) with fiber grating cladding. The structure in FIG. 2(c) uses grinding to fabricate D type fiber grating(11). The fiber cladding is chemically polished until close to the core(111). Then the waveguide grating(113) is formed by the periodic changes of the refractive index. The light travels along the fiber is effected by the grating.

The power of reflective light can be expressed as follows:

$$P_R = \frac{\kappa^2 \sinh^2(sL)}{s^2 \cosh^2(sL) + \delta^2 \sinh^2(sL)} \quad (1)$$

$$s^2 = \kappa^2 - \delta^2 \quad (2)$$

where

L is the total length of fiber grating in FIG. 2.

K is the coupling coefficient. It is related to the refractive index difference (in FIG. 2(a) $\Delta n = n2 - n3$) and optical frequency and can be express as $$\kappa = \frac{\pi \Delta n f}{c} \quad (3)$$

c is the speed of light ($=3 \times 10^8$ m/s)

$\delta$ is the detuning factor and can be expressed as $$\delta = \frac{2\pi n f}{c} - \frac{\pi}{\Lambda} \quad (4)$$

From the above equation it can be seen that $\delta$ is related to the grating pitch $\Lambda$.

When the temperature change is $\Delta T$, the relation between the center frequency of the fiber grating reflective spectrum (the frequency at which the reflection is maximum) and $\Delta T$ can be expressed as follows:

$$f_T = \frac{c}{[1 + (\alpha + \varsigma)\Delta T]\lambda_B} \quad (5)$$

$\alpha$ is the thermal expansion coefficient $\xi$ is the thermo-optic coefficient $\lambda_B$ is the Bragg wavelength$=2 n\Lambda$ n is the effective refractive index of fiber core.

The feature of the present invention is to use at least two fiber gratings with different thermal expansion coefficients and thermo-optic coefficients. If fiber Bragg gratings (FBG1) and fiber Bragg gratings (FBG2) have different α and ζ, the center frequencies of the fiber grating reflective spectrum have different shifts with temperature changes. Moreover, the powers of the reflective lights are different because both the grating pitch Λ and total length L are changed. The power outputs of the two fiber gratings can be simply expressed as functions of frequency and temperature as:

$$P_{R1}=M_1(f,T) \quad (6)$$

$$P_{R2}=M_2(f,T) \quad (7)$$

where $M_1$ and $M_2$ represents the transfer function of the fiber gratings. By finding the inverse function $\overline{M_1}$ and $\overline{M_2}$ the optical frequency and temperature can be derived by measured reflective power $P_{R1}$ and $P_{R2}$:

$$f=\overline{M_1}(P_{R1}, P_{R2}) \quad (8)$$

$$T=\overline{M_2}(P_{R1}, P_{R2}) \quad (9)$$

The signals measured by the power meter are sent to the microprocessor for comparison with stored function values to obtain the present optical frequency and temperature. Therefore the present invention can accurately measure the temperature without being effected by drifting of optical frequency.

Different materials can be used for the fiber gratings of the present invention. Different materials can be the fiber core, fiber cladding or fiber core and fiber cladding. Materials of different thermal expansion coefficient can be deposited on either fiber core, fiber cladding or fiber core and fiber cladding. The designed fiber Bragg gratings may have different grating pitch or different grating profile. The designed fiber Bragg grating can also use D type fiber with waveguide gratings of different thermal expansion coefficients and thermo-optic coefficients. The fiber grating might be of different materials or different total grating length or different grating pitch or different grating profile or different thermal expansion coefficient.

The fiber optic temperature sensor of the present invention uses digital circuit or analog circuit for its calculating operation. The fiber Bragg grating sensor can detect temperature and optical frequency simultaneously. Various microprocessors can be used to assist the detection. There are various memory in the microprocessor. After the microprocessor obtains the optical frequency a feedback circuit can be used to stabilize the frequency of the laser. The fiber Bragg grating material can be of rare earth material doped fiber amplifier. The fiber Bragg grating can be used for biomedical purpose and can be used together with other biomedical sensor so that small volume and integration is achieved. The present invention uses an optical frequency counter to measure the spectrum responses of the reflective light at different temperatures in advance and establishes a data bank in conjunction with a mathematical model so that the data can be used for temperature sensor at later time. The commercial optical frequency counter already has very high resolution, for example Anritsu MF9630A optical frequency counter has a resolution of 1 MHz at 1319 nm with an accuracy of 12 MHz. In the present application a resolution of 0.1° C. requires an optical frequency resolution of 4 GHz in the data bank. This indicates that with an Anritsu MF9630A optical frequency counter, a resolution of 0.01° C. can be achieved to establish the data bank. Therefore even when the optical frequency is drifting, the temperature can still be accurately measured in the present invention by equation (8) and (9). The present invention provides a fiber grating temperature measurement method that is not affected by drifting of the laser frequency and is very suitable for medical equipment applications.

In summary, the present invention "highly accurate temperature sensor using two fiber Bragg gratings" includes a laser light source, fiber couplers, two fiber Bragg gratings with different thermal response, photo-detector and a microprocessor, etc. It provides highly accurate temperature measurement and can be combined with other fiber sensors for in vivo blood vessel biomedical signal measurement. The resolution can be better than 0.01° C. with an operation range larger than 20° C. and the accuracy is not affected by drifting of laser frequency. The performance of the present invention is better than the familiar common types sensors with respect to the accuracy and its ability to calibrate other biomedical fiber sensors. It is ideal to combine with other fiber sensor for integration purpose.

One of ordinary skill should understand that a fiber sensor is chemically safe, of a compact size, and is immune to electromagnetic interference. Therefore, it is suitable for medical applications. Contamination of contacting blood with other electrical medical temperature sensors might be fatal. For instance, the paper published in Journal of Lightware Technology, vol. 13. pp. 1396–1406 (1995) (discussed at page 2 of the specification, above), shows that the fiberoptic in vivo monitoring sensors presenting multi functions can detect PH and the pressure of $O_2$ and $CO_2$ simultaneously.

Similarly, for example, the thermocouple embedded in the currently used in vivo sensor head for temperature monitoring can be replaced by a fiberoptic temperature sensor. According to researches of wavelength division multiplexing techniques applied in Fiber Bragg grating sensors, one of skill in the art would recognize that the sensor of the present invention is compatible with other fiber optic sensors.

Accordingly the sensor has been reduced (that is the fiber optic Bragg sensors are smaller than the microelectronic thermocouples). The diameter of a fiber optic Bragg gratings is about 125 micrometers, which is smaller than the diameter of a standard thermocouple. One of skill in the art should similarly recognize this aspect of the invention.

The optical sensor does not need optical frequency or wavelength spectrum analyzers. Based on the disclosure, one of ordinary skill should recognize that two Fiber Bragg grating sensors with different thermal expansion coefficients could be used to determine the equations 6 and 7 at page 8 of the specification. By using the inverse function as equations 8 and 9 (see page 8–9), the temperature and optical frequency can be determined simultaneously. Therefore, a frequency counter may be used to calibrate the sensor, and two optical photo detectors can be used to replace any optical frequency or wavelength spectrum analyzer.

The present invention laser does not need any feedback circuit to stabilize the optical frequency. Instead, the microprocessor just calculates the temperature and frequency simultaneously and a feedback algorithm is not needed to provide signals to lasers for controlling optical frequency.

One of ordinary skill should recognize that Fiber Bragg grating sensor will find out the Bragg wavelength drifting amount corresponding the physical quantity for sensing. The resolution and accuracy are limited by the resolution and accuracy of optical spectrum analyzer. In the present invention, the frequency counter is used to calibrate the FBG sensors. The frequency counter can have much higher optical frequency and wavelength resolution than optical spectrum analyzer. Photo detectors are used as optical signal detectors, and has a higher resolution than the optical spectrum analyzer which can only test the wavelength shift. Therefore, the resolution and accuracy can be improved. Optical frequency drifting of the laser will be calculated by the present invention simultaneously with the temperature. The drifting errors of the laser will be largely reduced by the calculations of the microprocessor.

The accuracy of the sensor has been demonstrated by experimental results. As to why a thermocouple sensor contaminates the blood of a patient while a fiber optic sensor does not, one of skill in the art would recognize that the material of a fiber optic sensor is glass which will not react with the blood. The material of a thermocouple sensor is metal which will be corroded by blood. This corrosion will contaminate the blood of the patient. The thermal couple will generate a small electrical potential difference between its two metal wires. The electrical potential will induce electrolysis in blood. Fiber optical sensors will not generate any electrical signals in blood of the patient.

One of skill would recognize that the thermal expansion will induce reflective spectrum shift, the direction and the amount of shifting depend on the thermal expansion coefficient $\alpha$ and thermo-optical coefficient $\xi$. From equation 5, one can calculate the shift induced by temperature change $\Delta T$. From equation 1, one can simulate the whole power Spectra Shifting. Then from the principle explained above with reference to equations 6–9, the method of Bragg sensor detects the temperature change.

The reason why the optical frequency response of the optical coupler is of no concern because one of ordinary skill in the art would recognize that the optical frequency response of the optical coupler is in the order of terra hertz, which exceeds the spectrum detection range. In addition, the response is adjusted for by the microprocessor.

One of ordinary skill in the art would recognize that using two Bragg sensors adds more degrees of freedom therefore can calculate optical frequency and temperature simultaneously. Accordingly, this system does not have to use a frequency stabilized light source. With one Bragg sensor, the frequency of light should be stabilized for acquiring accurate data. One of ordinary skill in the art would recognize that this sensor can be integrated with other biomedical sensors, such as pH sensor, blood $O_2$ sensor and $CO_2$ sensors described in IEEE Journal of Lightwave Technology, vol. 13, pp. 1396–1406 (1995).

One of ordinary skill in the art would recognize that one can calibrate this sensor by using anritsu MF9630A frequency counter for measuring reflective power spectra. (Page 10, lines 13–16). Since the fiber sensor is made from silica, such a material can be applied in high temperature environment. Based on the disclosure, one of ordinary skill would recognize that the Bragg sensors can be designed with different pitches or profiles in order to achieve different frequency response.

As noted above, temperature and optical frequency are determined simultaneously based upon a spectrum shift of the two Fiber Bragg grating sensors with different thermal expansion coefficients to determine equations 6 and 7. The inverse function are then used as equations 8 and 9. One of ordinary skill in the art would recognize that any analog circuit which can calculate the inverse equations 8 and 9 will be suitable. Accordingly, any suitable analog circuit may be used to calculate the inverse equations. It is not necessary to disclose the specifics of the circuits in order for one of ordinary skill in the art to reproduce the invention without undue experimentation.

The present invention meets the requirement for new patent and we therefore issue the patent application according to the patent law.

What is claimed is:

1. A fiber optic temperature sensor comprising a laser source emitting a laser beam, a first optical coupler arranged to divide the laser beam into a first beam path and a second beam path, a second optical coupler arranged to divide the first beam path to a third beam path and a fourth beam path, a third optical coupler arranged to divide the second beam path to a fifth beam path and a sixth beam path, first and second fiber Bragg gratings forming a temperature sensor, the first fiber Bragg grating connected to the third beam path and providing reflected light to the fourth beam path and the second fiber Bragg grating connected to the fifth beam path and providing reflected light to the sixth beam path, a first photodetector connected to the fourth beam path to detect spectrum changes with temperature of the first fiber Bragg grating from reflected light on the fourth beam path, a second photodetector connected to the sixth beam path to detect spectrum changes with temperature of the second fiber Bragg grating from reflected light on the sixth beam path, and a microprocessor connected to the first and second photodetectors to determine a temperature measurement based upon the detected spectrum changes from the first and second photodetectors.

2. The device claimed as claim 1, wherein the laser source has a spectral linewidth narrower than the spectral linewidth of either a transmission or reflection spectrum of the first and second fiber Bragg gratings.

3. The device claimed as claim 1, wherein the first, second and third optical couplers each comprise a beam divider.

4. The device claimed as claim 1, wherein the optical frequency response of the first, second and third optical couplers are calibrated in advance and data in the microcomputer is adjusted accordingly.

5. The device claimed as claim 1, wherein the grating of the first and second fiber Bragg grating can be fabricated on fiber core, fiber cladding, fiber core and fiber cladding.

6. The device claimed as claim 1, wherein the first and second fiber Bragg gratings have different thermal expansion coefficients and thermo-optic coefficients.

7. The device claimed as claim 6, wherein the different materials can be a fiber core, fiber cladding or fiber core and fiber cladding.

8. The device claimed as claim 6, wherein the materials of different thermal expansion coefficients are deposited on the first and second fiber Bragg gratings.

9. The device claimed as claim 6, wherein the gratings of the first and second fiber Bragg gratings each have different pitches or different grating profiles.

10. The device claimed as claim 6, wherein the first and second fiber Bragg grating use ground D type fiber optic to fabricate waveguide gratings of different thermal expansion coefficient and thermo-optic coefficient on the ground fiber core.

11. The device claimed as claim 10, wherein the D type fiber grating have different materials or different total grating length or different grating pitch or different grating profile or different thermal expansion coefficient.

12. The device claimed as claim 1, wherein a digital circuit or analog circuit is used for calculating operation.

13. The device claimed as claim 1, wherein both temperature and optical frequency are measured simultaneously.

14. The device claimed as claim 1, wherein microprocessors of various types can be used.

15. The device claimed as claim 1, wherein the microprocessor has various memory device.

16. The device claimed as claim 13, wherein frequency stabilization of the laser source can be achieved through a feedback circuit after frequency is calculated by microprocessor.

17. The device claimed as claim 6, wherein rare earth doped fiber amplifier is used as the first and second fiber Bragg grating.

18. The device claimed as claim 1, wherein the fiber grating temperature sensor can be used for biomedical applications.

19. The device claimed as claim 18, wherein the fiber grating temperature sensor can be combined with other biomedical sensors to achieve small volume and integration purpose.

20. The device claimed as claim 1, wherein a fiber grating temperature sensor can be used for temperature calibration and temperature sensing in high temperature environment.

* * * * *